United States Patent [19]

Cenker et al.

[11] 3,994,839
[45] Nov. 30, 1976

[54] URETHANE MODIFIED CARBODIIMIDE FOAMS DERIVED FROM FLAME RETARDANT POLYOLS

[75] Inventors: Moses Cenker, Trenton; Peter T. Kan, Plymouth; Earl J. Robertson, Trenton, all of Mich.

[73] Assignee: BASF Wyandotte Corporation, Wyandotte, Mich.

[22] Filed: Oct. 29, 1974

[21] Appl. No.: 518,723

[52] U.S. Cl. .................. 260/2.5 AZ; 260/2.5 AJ; 260/2.5 AQ; 260/2.5 AM; 260/2.5 AV; 260/2.5 AW; 260/2.5 BF
[51] Int. Cl.$^2$ .................. C08G 18/14; C08G 18/38
[58] Field of Search .................. 260/2.5 AJ, 2.5 AV, 260/2.5 BF, 2.5 AW, 2.5 AQ, 2.5 AM

[56] References Cited
UNITED STATES PATENTS

| | | | |
|---|---|---|---|
| 3,620,986 | 11/1971 | Diehr | 260/2.5 BF |
| 3,639,542 | 2/1972 | Pizzini | 260/2.5 AJ |
| 3,644,232 | 2/1972 | Bernard | 260/2.5 AW |
| 3,725,319 | 4/1973 | Frisch | 260/2.5 AJ |
| 3,738,953 | 6/1973 | Anorga | 260/2.5 AT |
| 3,745,133 | 7/1973 | Comunale | 260/2.5 AW |
| 3,763,057 | 10/1973 | Diehr | 260/2.5 AW |
| 3,772,217 | 11/1973 | Kan | 260/2.5 BF |
| 3,793,236 | 2/1974 | Ashida | 260/2.5 AW |
| 3,803,064 | 4/1974 | Fishbein | 260/2.5 AW |

Primary Examiner—C. Warren Ivy
Attorney, Agent, or Firm—Bernhard R. Swick; Arnold S. Weintraub; Robert E. Dunn

[57] ABSTRACT

Rigid cellular foams characterized by carbodiimide linkages are prepared by the catalytic condensation of an organic polyisocyanate in the presence of a halogen or phosphorus-containing active hydrogen compound to provide urethane modified foams having a skin of improved flame retardancy.

9 Claims, No Drawings

URETHANE MODIFIED CARBODIIMIDE FOAMS DERIVED FROM FLAME RETARDANT POLYOLS

BACKGROUND OF THE INVENTION

1. Field of the Invention

The present invention pertains to rigid cellular foams characterized by carbodiimide linkages. More particularly, the present invention pertains to urethane-modified rigid cellular foams characterized by carbodiimide linkages. Even more particularly, the present invention concerns urethane-modified rigid cellular foams characterized by carbodiimide linkages having skins of improved flame retardancy, as well as reduced friability and which can be prepared from distilled toluene diisocyanate.

2. Prior Art

There has been described heretofore the preparation of rigid cellular foams characterized by carbodiimide linkages. See, inter alia, U.S. Pat. Nos. 3,645,923; 3,717,596; 3,723,366 and 3,772,217. Generally, these rigid cellular foams are prepared by the catalytic condensation of an organic polyisocyanate in the presence of suitable catalytic systems which promote both carbodiimide and isocyanurate formation. The resulting foams, thus, contain carbodiimide linkages, isocyanurate groups, as well as, some free isocyanate. To enhance the properties of the foams, the prior art, also, teaches the inclusion into the foam formulation of various active hydrogen-containing compounds. Yet, the prior art foams were found to be deficient with respect to friability and the inability to utilize distilled toluene diisocyanate.

To alleviate these problems, there has been developed urethane-modified carbodiimide foams from crude methylene diphenyl diisocyanate, and the like. See, inter alia, U.S. Pat. Nos. 3,645,923; 3,723,336; 3,748,239; 3,766,103; 3,732,189; 3,806,475; 3,824,240; 3,824,239; etc. More recently, there has been developed urethane-modified carbodiimide foams prepared from distilled toluene diisocyanate as well as acid-modified distilled toluene diisocyanate. According to this development, a quasi-prepolymer, a two-step or a one-step process is employed wherein the isocyanate is reacted in the presence of a highly reactive polyol to cause urethane formation, thereby alleviating the problem of friability. These developmens are more particularly described in copending U.S. Pat. application Ser. No. 511,111, filed Oct. 2, 1974 and entitled "Urethane-Modified Carbodiimide-Isocyanurate Foams Prepared From TDI-Rich Isocyanate" and copending U.S. Pat. application Ser. No. 511,112, filed Oct. 2, 1974, and entitled "Carbodiimide-Isocyanurate Foams Prepared From Acid-Modified Toluene Diisocyanate".

Although the urethane-modified foams exhibit improved properties over previous foams, not so-modified, it has been found that the skins thereof have a high urethane content, with respect to carbodiimide and isocyanurate groups, as compared to the core, and, thus, exhibit a lower flame retardancy than the core. The present invention is, therefore, directed to a solution for upgrading the flame retardancy of the skin of the urethane-modified carbodiimide foams.

SUMMARY OF THE INVENTION

In accordance with the present invention urethane-modified rigid cellular foams characterized by carbodiimide linkages are prepared by the catalytic condensation of an organic polyisocyanate in the presence of a flame retardant active hydrogen-containing compound.

The flame retardant active hydrogen-containing compounds are, generally, halogen and/or phosphorus-containing polyols. The flame retardants are deployed, optionally, in admixture with anotehr active hydrogen-containing compound.

The foams hereof are prepared by any conventional process including a one-step process, a quasi-prepolymer process or a two-stage process and using any conventional carbodiimide catalyst.

The carbodiimide catalyst can be used alone or in admixture with an isocyanate trimerization catalyst. Also, depending upon the reactivity of the active hydrogen-containing compounds, a urethane catalyst may be included.

The foams produced herein are urethane-modified foams having skins which exhibit improved flame retardancy over similar foams devoid of the flame retardant.

For a more complete understanding of the present invention reference is made to the following detailed description and accompanying examples.

DESCRIPTION OF THE PREFERRED EMBODIMENTS

The present invention provides urethane-modified rigid cellular foams characterized by carbodiimide linkages wherein the skins thereof exhibit improved flame retardancy. The foams hereof are prepared by the catalytic condensation of an organic polyisocyanate in the presence of a flame retardant active hydrogen-containing compound.

At the outset it is to be noted and understood that the present foams, although defined as being characterized by carbodiimide linkages or as carbodiimide foams do contain other linkages or groups therewithin. The basic reaction of organic polyisocyanate and carbodiimide catalyst produces, in addition to carbodiimide linkages, isocyanurate groups. The conjoint use of an isocyanate trimerization catalyst promotes the generation of an exotherm to activate the carbodiimide catalyst and concommitantly produces further amounts of isocyanurate. Finally, the use of a pre-selected active hydrogen-containing compound in the foam formulation introduces urethane, urea, amide or like groups into the resulting foams. Where the active hydrogen compound is a polyol and is present in any appreciable extent the foams produced are essentially urethane-modified foams. Thus, the foams contemplated herein contain urethane, carbodiimide and isocyanurate therewithin. However, for purposes of brevity, the foams produced by the practice of the present invention shall be referred to as urethane-modified carbodiimide foams.

It should further be noted that the basic carbodiimide foams, without any appreciable urethane, do not exhibit any need for the incorporation of flame retardants. However, to alleviate the problem of friability, urethane modification of the basic carbodiimide foams is the most practicable solution. Yet, it was unexpectedly discovered that in preparing urethane-modified carbodiimide foams there was a higher concentration of urethane groups, in the skins thereof, relative to the concentration of carbodiimide and isocyanurate groups, as compared to the concentration of urethane groups, relative to the concentration of carbodiimide and isocyanurate groups, in the cores of such foams.

Hence, the cores exhibit a much greater flame retardancy than the skins. This is true with respect to machine sprayed foams and hand mixed foams. This observation which is exemplified subsequently, is not overcome by varying catalyst ratios or foaming conditions. Thus, the present invention overcomes this difficulty by the incorporation of the herein considered flame retardants.

In carrying out the present invention any organic polyisocyanate can be used. Generally, the polyisocyanates correspond to the formula:

$$R(NCO)_z$$

wherein R is a polyvalent organic radical selected from the group consisting of aliphatic, aromatic, arylakyl and alkylaryl organic radicals, as well as mixtures thereof; and Z is an integer corresponding to the valence number of R and is at least 2. Representative of the organic polyisocyanates contemplated herein include for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4′,4″-triphenylmethane triisocyanate; the aromatic tetraisocyanates such as 4,4′-dimethyldiphenylmethane-2,2′,5,5′-tetraisocyanate, and the like; aralkyl polyisocyanates, such as xylylene diisocyanate; aliphatic polyisocyanates, such as hexamethylene-1,6-diisocyanate, lysine diisocyanate methylester and the like, and mixtures thereof. Other useful organic polyisocyanates include:
 polymethylene polyphenylisocyanate,
 hydrogenated methylene diphenylisocyanate,
 m-phenylene diisocyanate,
 naphthylene-1,5-diisocyanate,
 1-methoxyphenyl-2,4-diisocyanate,
 diphenylmethane-4,4′-diisocyanate,
 4,4′-biphenylene diisocyanate,
 3,3-dimethoxy-4,4′-biphenyl diisocyanate,
 3,3′-dimethyl-4,4′-biphenyl diisocyanate, and
 3,3′-dimethyldiphenylmethane-4,4′-diisocyanate,
and the like.

These polyisocyanates are prepared by conventional methods in the art such as the phosgenation of the corresponding organic amine.

Still another class of organic polyisocyanates useful herein are isocyanate-terminated quasi-prepolymers. These quasi-prepolymers are prepared by reacting excess organic polyisocyanate or mixtures thereof with a minor amount of an active hydrogen-containing compound. Suitable active hydrogen-containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; as well as mixtures thereof. Compounds which contain two or more different groups within the above-defined classes may also be used such as, for example, compounds which contain one —SH groups and one —OH group.

Any suitable hydroxyl-containing polyester may be used such as are obtained, for example, from polycarboxylic acids and polyhydric alcohols. Any suitable polycarboxylic acid may be used as oxalic acid, malonic acid, succinic acid, glutaric acid, adipic acid, pimelic acid, suberic acid, azelaic acid, sebaic acid, brassylic acid, thapsic acid, maleic acid, fumaric acid, glutaconic acid, α-hydromuconic acid, β-hydromuconic acid, butyl-α-ethylglutaric acid, α,β-diethyl-succinic acid, isophthalic acid, terephthalic acid, hemimellitic acid, and 1,4-cyclohexanedicarboxylic acid. Any suitable polydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentanediol, 1,4,-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenol such as 2,2-bis(4-hydroxyphenyl)propane, commonly known as Bisphenol A.

Any suitable polyalkylene ether polyol may be used such as the polymerization product of an alkylene oxide with a polyhydric alcohol. Any suitable polyhydric alcohol may be used such as those disclosed above for use in the preparation of hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide tetrahydrofuran blends; epihalohydrins such as epichlorohydrin; as well as aralkylene oxides such as styrene oxide. The polyalkylene polyether polyols may have either primary or secondary hydroxyl groups, and preferably, are polyethers prepared from alkylene oxides having from two to six carbon atoms such as polyethylene ether glycols, polypropylene ether glycols, and polybutylene ether glycols. The polyalkylene polyether polyols may be prepared by any known process, such as, for example, the process disclosed in Wurtz in 1859 and Encyclopedia of Chemical Technology, vol 7, pp. 257–262, published by Interscience Publishers, Inc. (1957) or in U.S. Pat. No. 1,922,459.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72 to about 95%. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethane dithiol, 1,2-propane dithiol, 1,3-propane dithiol, and 1,6-hexane dithiol, alkene thiols such as 2-butene-1,4-dithiol, and alkyne thiols such as 3-hexyne-1,6-dithiol.

Other compounds which do not necessarily fit within any of the previously set forth classes of compounds which are quite suitable in the production of these other quasi-prepolymers compounds include the hydroxy-terminated polyurethane polymers such as a hydroxy-terminated polymer made by reacting the isocyanate with several moles of an alkylene glycol.

The flame retardant active hydrogen-containing compound contemplated for use herein is generally a halogen or phosphorus-containing polyhydroxyl compound, or a polyhydroxyl compound containing both halogen and phosphorus therewithin. Representative of the halogen substituted polyhydroxyl compounds or polyols useful herein include the linear or branched chain aliphatic polyols having at least two hydroxyl groups; aliphatic esters derived from the condensation of a polyol and an anhydride; halogen-substituted aromatic esters derived from the reaction of aromatic anhydrides and polyols, as well as polyols derived from the condensation reaction of halogen substituted epoxides and polyhydroxyl compounds.

Representative phosphorus polyols include polyhydroxyl based phosphates, phosphonates, phosphites and phosphine oxides. Also, the halogen and phosphorus containing compounds can be prepared from the reaction of a polyhydroxyl compound, a phosphate-containing polyol and a halogen-substituted anhydride.

Other useful flame retardants contemplated for use herein are polyhydroxyl compounds containing arsenic and antimony. These compounds may be arsine and stibine derivatives having hydroxyl-containing substituents. Alternatively these compounds may be esters or arsonic and stibonic acids.

Typifying the flame retardant polyols contemplated herein are tetrabromodiethyleneglycol, the reaction products of oxyalkylated polyhydroxyl compounds with chlorendic anhydride; the reaction products of tetrabromophthalic and tetrachlorophthalic anhydrides with polyols; 3,3,3-trichloro-1,2-propylene oxide and 4,4,4-trichloro-1,2-butylene oxide reaction products with polyhydroxyl compounds.

Useful polyhydroxyl compounds and polyols are those enumerated hereinabove with respect to the quasi-prepolymers.

Other representative compounds encompassed by the present invention include aliphatic ester type compounds such as the oxyethylated and/or oxypropylated adducts of the half-ester prepared from chlorendic or dichloromaleic anhydride and the ethylene oxide and/or propylene oxide adduct of a polyhydroxyl initiator such as, pentaerythritol, glycerine, sucrose, ethylene glycol and the like. Also, aromatic compounds contemplated herein include those derived from the use of tetrabromophthalic anhydride in lieu of the aliphatic anhydrides, i.e., chlorendic or dichloromaleic anhydrides.

Phosphorus-type flame retardant polyols include the homopolymers or heteric or block copolymers of ethylene oxide and/or propylene oxide adducts of 100% phosphoric acid, 115% phosphoric acid, phenylphosphonic acid, chloromethylphosphonic acid, phosphorus acid, tris(2-hydroxymethyl)phosphine oxide, tris(2-hydroxy-n-propyl)phosphine oxide and like oxyalkylated adducts.

Typical phosphorus and halogen containing flame retardant polyols include the oxyethylated and/or oxypropylated reaction product of tetrabromophthalic anhydride with the ethylene oxide and/or propylene oxide homopolymers, heteric or block copolymer adducts of 100 or 115% phosphoric acid.

Mixtures of any of the flame retardants can be used herein.

The flame retardant is generally employed in an amount ranging from about one to fifty percent, by weight, based on the weight of the organic polyisocyanate. Preferably, the flame retardant is employed in an amount ranging from about five to thirty-five percent, by weight, based on the weight of the organic polyisocyanate.

In preparing the urethane-modified carbodiimide foams hereof, it is advantageous to employ the flame retardant in admixture with another isocyanate reactive active hydrogen-containing compound. Any of the hereinbefore defined active hydrogen-containing compounds can be used in admixture with the flame retardant. A particularly preferred active hydrogen-containing compound is the Mannich condensation product comprising a triol derived from phenol, formaldehyde, diethanolamine and propylene oxide. This compound is sold commercially by Jefferson Chemical Co. under the name Thanol R-350X.

The flame retardant and other active hydrogen-containing compounds are, generally, employed in a respective weight ratio ranging from about 1:5 to about 5:1, and, preferably, from about 1:3 to about 3:1, when an admixture of same is employed.

In preparing the urethane-modified carbodiimide foams hereof any suitable process can be effectively utilized. Thus, a one-shot or one-step process wherein the ingredients in the foam fomulation are simultaneously admixed and reacted together can effectively be employed. Also, a quasi-prepolymer technique such as described in the above-referred to copending U.S. Pat. application Ser. No. 511,111, can be used. Although this application describes the process with respect to enabling the use of distilled toluene diisocyanate, the process is useful with respect to all organic polyisocyanates which are useful herein. According to this method an excess amount of polyisocyanate is first reacted with the flame retardant alone, or in admixture with another active hydrogen-containing compound, to form an isocyanate-terminated quasi-prepolymer. This quasi-prepolymer is, then, catalytically condensed in the presence of a suitable catalyst. Another useful process comprises the two-stage process wherein an in situ quasi-prepolymer is formed prior to the catalytic condensation thereof. This process is, also, described in the aforementioned copending application.

In carrying out the condensation reaction to produce the instant foam compositions, the ingredients, depending on the processing technique, are catalytically condensed in the presence of a catalytically sufficient amount of a carbodiimide catalyst, alone, or in admixture with an isocyanate trimerization catalyst. Additionally, and, again, depending on the processing technique, as well as the reactivity of the flame retardant or admixture thereof with the other active hydrogen-containing compound, a urethane catalyst may also be employed.

In utilizing a co-catalyst system of carbodiimide catalyst and isocyanate trimerization catalyst, the catalysts are employed in a, respective, weight ratio of from about 7:1 to 1:7, and, preferably, from about 3:1 to 5:1. When a urethane catalyst is employed, as well, it is present, with respect to the co-catalyst system, in a, respective, weight ratio of from about 1:6 to 1:1, and, preferably, from about 1:2 to about 1:4.

Useful carbodiimide catalysts include those described in U.S. Pat. Nos. 3,806,475, 3,645,923, 3,717,596, 3,824,239, and 3,824,240, the disclosures of which are hereby incorporated by reference.

Useful isocyanate trimerization catalysts which can be utilized herein, include, any of the well-known isocyanate trimerization catalysts, such as, those described in U.S. Pat. Nos. 3,766,103; 3,723,366 and 3,717,596.

Thus, any conventional carbodiimide catalyst and trimerization catalyst can be used in the practice hereof.

Any suitable urethane catalyst can be used herein, such as tertiary amines and metallo-organic salt catalysts which are polyvalent metal salts of an organic acid having up to about eighteen carbon atoms and being void of active hydrogen atoms. The organic portion of the salt may be either linear, or cyclic, saturated or unsaturated. The polyvalent metal has a valence of from about 2 to 4.

Representative tertiary amines include, for example, diethylene triamine ketimine, tetramethylethylene diamine, triethylene diamine, tetramethylbutane diamine, tetramethyl quanidine, trimethylpiperazine and the like.

Typical organo-metallic salt catalysts include stannous acetate, stannous butyrate, stannous 2-ethylhexoate, stannous pentane carboxylate, cadmium cyclohexane carboxylate, lead naphthenate, lead octoate, cobalt naphthenate, zinc naphthenate, bis(phenylmercurydodecyl) succinate, phenylmercuric benzoate, cadmium naphthenate, dibutyltin dilaurate, dibutyltin diacetate, and dibutyltin di-2-ethylhexanoate.

Generally, the urethane catalyst is employed in an amount ranging from about 0.5 to about 15 parts, by weight, based on the weight of the active hydrogen-containing compound, and, preferably, from about 5 to 15 parts by weight, based on 100 parts by weight of the active hydrogen-containing compound.

Because of the exothermic nature of the isocyanate trimerization reaction, which activates the carbodiimide catalyst, the condensation reaction normally starts at room temperature, independent of the processing technique.

In preparing the foams hereof additional ingredients can be incorporated into the foam formulation to tailor the properties thereof. Thus, plasticizers, such as tris(2-chlorethyl) phosphate; surfactants, such as the silicone surfactants, e.g., alkylpolysiloxanes and polyalkylsiloxanes can be used herein. Further additional ingredients include auxiliary or supplemental blowing agents, such as water or halohydrocarbons, for density control; inorganic fillers, pigments and the like. The additional ingredients can be incorporated herein by any suitable technique, such as those disclosed in the hereinbefore referred to patents.

The products hereof, as hereinbefore noted, are rigid cellular products containing carbodiimide, isocyanurate and urethane groups therewithin, and wherein the skin is of improved flame retardancy. The foams have a density of from about one to three pounds per cubic foot. Moreover, the foams exhibit low friability, excellent uniform flame retardancy and compressive strength.

Following are specific, non-limiting examples of the present invention. In the examples which are illustrative of the principles set forth herein, all parts are by weight, absent indications to the contrary.

EXAMPLE I

This example illustrates the problems encountered in the prior art relative to the flame retardancy of the skin of urethane-modified carbodiimide foams.

Into a suitable vessel equipped with stirring means and under a nitrogen blanket was charged 91.5 parts of crude methylene diphenyl diisocyanate and 20 parts of a triol derived from the Mannich condensation of phenol, formaldehyde, diethanolamine and propylene oxide. This triol is sold by Jefferson Chemical under the name THANOL R-350X. To this mixture was then added, with stirring, 2 parts of 2,4-bis(diethylamino)-6-(N-methylethanolamino)-s-triazine (DMT), as the carbodiimide catalyst and 3 parts of 1,3,5-tris(3-dimethylaminopropyl)-s-hexahydrotriazine (TDH) as the isocyanate trimerization catalyst. Also, admixed with the two catalysts was 0.25 parts of lead octoate as the urethane catalyst. Pre-blended with the catalyst system were 20 parts of stabilized fluorotrichloromethane, as an auxiliary blowing agent, and 0.5 parts of a polysiloxane surfactant sold by Dow Corning under the designation DC-193.

Then, to vary the catalysts and amount of polyisocyanate this procedure was then repeated utilizing 95.5 parts of crude methylene diphenyl diisocyanate, 20 parts of the triol, 1 part of DMT, 6 parts of TDH and 0.25 parts of dibutyltin dilaurate. Then, a third foam sample was prepared utilizing 92.0 parts of crude methylene diphenyl diisocyanate, 20 parts of triol, 2 parts of DMT, 3 parts of TDH and 0.5 parts of dibutyltin silaurate.

Each of the three so-prepared foam samples were cut to obtain skin and core samples therefrom. The skin and core samples were then tested for flammability using the 30/30 Tunnel Flame Spread Test[1]. The results thereof are set forth below:

| SAMPLE | FOAM PART | 30/30 TUNNEL[1] FLAME SPREAD |
|---|---|---|
| A | Skin | 33 |
|   | Core | 25 |
| B | Skin | 35 |
|   | Core | 21 |
| C | Skin | 31 |
|   | Core | 25 |

[1]Levy, M., "A Simplified Method For Determining Flame Spread", J. Cell Plas., April, 1967.

Thus, the drastic difference in flame retardancy between the skin and core of urethane-modified carbodiimide foams is rendered apparent.

EXAMPLE II

To test the efficacy of the present invention and to provide a standard comparison between urethane-modified carbodiimide foams containing no flame retardant, an admixture of flame retardant and active hydrogen-containing compound, and only flame retardant polyol, three urethane-modified carbodiimide foam samples were prepared by the following procedure:

Into a suitable reaction vessel equipped with stirring means was charged 92 parts of crude methylene diphenyldiisocyanate and varying amounts of the THANOL R-350X, as the other active hydrogen compound or polyol, alone, or in admixture with varying amounts of a flame retardant polyol. To the mixture was then added, in admixture, 2 parts of DMT, 3 parts of TDH and 0.5 parts of dibutyltin dilaurate, the latter being a urethane catalyst.

Pre-blended with the catalyst mixture were 20 parts of stabilized fluorotrichloromethane, as a blowing agent and 0.5 parts of a polysiloxane surfactant sold by Dow Corning under the designation DC-193.

After the foams were prepared, they were then tested for flame properties with respect to skin and core, as outlined in Example I.

The following table, Table I, sets forth the amounts of flame retardant polyol and other polyol used to prepare the foams, as well as, the results of the flame retardancy tests:

with the chlorendic anhydride half-ester of a propylene oxide adduct of pentaerythritol. With stirring there was added thereto a co-catalyst mixture of DMT and TDH having admixed therewith 0.5 part of dibutyltin dilaurate, as the urethane catalyst. Pre-blended with the catalyst mixture was e parts of tris(2-chloroethyl) phosphates, as a plasticizer, 1 part of the hereinbefore defined DC-193 surfactant, as well as varying amounts of stabilized fluorotrichloromethane blowing agent.

The stirring was continued until the exothermic reaction began. There was, thus, obtained urethane-modified carbodiimide foams in accordance herewith.

Table II, set forth below shows the amounts and types of the varying ingredients. Table III sets forth the physical properties of the foams.

TABLE II

| Sample | Isocyanate TDI[1] | CMDI[2] | Flame Retardant | DMT | TDH | Blowing Agent |
|---|---|---|---|---|---|---|
| 4 | 60 | 40 | 20 | 3 | 2 | 10 |
| 5 | 60 | 40 | 25 | 3 | 3 | 14 |
| 6 | 50 | 50 | 15 | 3 | 3 | 12 |
| 7 | 50 | 50 | 25 | 3 | 3 | 16 |

[1]an 80:20 weight mixture of 2,4- and 2,6-toluene diisocyanate
[2]crude methylene diphenyldiisocyanate

TABLE III

| Sample | Density pcf. | Comp. Str.[1] 10% Defl., psi. | Tumbling[2] Friab., % Wt. Loss | Closed Cell Content % | Butler Chimney Test[3] % Wt. Ret. | Flame Ht. in. | Time Tc Sx[4] sec |
|---|---|---|---|---|---|---|---|
| 4 | 1.7 | 19.7 | 26 | 107 | 87 | 8 | 12 |
| 5 | 1.9 | 15.3 | 21 | 99 | 88 | 9 | 10 |
| 6 | 1.6 | 15.6 | 29 | 99 | 90 | 6 | 10 |
| 7 | 2.4 | 29.3 | 17 | 98 | 90 | 8 | 10 |

[1]ASTM D-1621
[2]ASTM C-421
[3]ASTM D-3014
[4]Self-extinguishment

TABLE I

| Sample | Other Polyol | Flame Retardant | Flammability Tests Butler Chimney Wt. Ret. % | 30/30 Tunnel Flame Spread |
|---|---|---|---|---|
| 1 | 20 | — | 89 | Skin 34 Core 22 |
| 2 | 10 | 10[1] | 91 | Skin 28 Core 22 |
| 3 | 10 | 10[2] | 92 | Skin 28 Core 19 |

[1]a flame retardant polyol having an average hydroxyl number of about 230 and comprising an oxypropylated half-ester of tetrabromophthalic anhydride and a propylene oxide adduct of pentaerythritol.
[2]a flame retardant polyol having an average hydroxyl number of about 187 and comprising an oxypropylated adduct of tetrabromophthalic anhydride and a propylene oxide adduct of 100% phosphoric acid.

The advantages of the inclusion of flame retardant polyol is readily apparent from a review of the data set forth in Table I.

EXAMPLE III

A series of urethane-modified carbodiimide foams were prepared by one-shot process by the following procedure:

Into a suitable reaction vessel equipped with stirring means was charged 100 parts of an organic polyisocyanate and varying amounts of a flame retardant polyol having an average hydroxyl number of about 259 and comprising the addition of product of propylene oxide It can be seen from the above that the present invention provides excellent urethane-modified carbodiimide foams.

EXAMPLE IV

A series of urethane-modified carbodiimide foams were prepared from varying quantities of (1) organic polyisocyanates, (2) co-catalyst systems and (3) flame retardant polyol.

The flame retardant polyol consisted essentially of the propylene oxide reaction product with tetrabromophthalic anhydride half-ester adduct with oxypropylated pentaerythritol, the polyol having an average hydroxyl number of about 230.

In preparing this series of foams, samples 8, 11 and 12 were prepared by a one-shot process as defined in Example III. Samples 9 and 10 were prepared by a quasi-prepolymer technique, as described in the above-referred to copending application.

In preparing the foams of samples 8–12 there was pre-blended with the co-catalyst system 0.5 parts of dibutyltin dilaurate as the urethane catalyst and varying amounts of the plasticizer, surfactant and blowing agent utilized in Example III.

The following tables, Tables IV and V, set forth, respectively, the amounts of the varying ingredients and the physical properties of the foams.

TABLE IV

| Sample | Isocyanate TDI | Isocyanate CMDI | Flame Retardant | DMT | TDH | Plasticizer | Surfactant | Blowing Agent |
|---|---|---|---|---|---|---|---|---|
| 8 | 80 | 20 | 30 | 3 | 3 | 0.5 | 0.5 | 21 |
| 9 | 60 | 40 | 15 | 6 | 3 | 0.5 | 0.5 | 15 |
| 10 | 60 | 40 | 20 | 3 | 3 | 0.5 | 0.5 | 18 |
| 11 | 70 | 30 | 30 | 1 | 6 | 2 | 1 | 18 |
| 12 | 60 | 40 | 30 | 2 | 6 | 2 | 1 | 17 |

TABLE V

| Sample | Density pcf. | Compr. Str., 10% Defl., psi. | Tumbling Friab., % Wt. Loss | Closed Cell Content % | Butler Chimney Test % Wt. Ret. | Butler Chimney Test Flame Ht., In. | Butler Chimney Test Time To Sx. Sec. |
|---|---|---|---|---|---|---|---|
| 8 | 1.9 | 21.1 | — | — | 94 | 6 | 10 |
| 9 | 2.0 | 21.4 | — | 100 | 92 | 6 | 10 |
| 10 | 1.9 | 18.3 | — | 100 | 93 | 5 | 10 |
| 11 | 1.8 | 16.6 | 41 | 99 | 92 | 5 | 10 |
| 12 | 2.1 | 32.1 | 27 | 100 | 90 | 6 | 10 |

From the above data it can be seen that the use of a flame retardant polyol in urethane-modified carbodiimide foams enhances the properties thereof.

EXAMPLE V

Utilizing a one-shot process, into a suitable reaction vessel equipped with stirring means was charged 100 parts of crude methylene diphenyldiisocyanate, 6.7 parts of the triol known as THANOL R-350X and 13.3 parts of a flame retardant polyol. The flame retardant polyol employed herein was the 230 hydroxyl number oxypropylated adduct of the half-ester derived from the reaction of tetrabromophthalic anhydride with the propylene oxide adduct of pentaerythritol, as defined in Example IV.

The mixture of polyols and polyisocyanate was catalytically condensed with a catalyst system containing 4 parts of DMT, 0.5 part of TDH, 4 parts of a mixture of o- and p-(dimethylaminomethyl)phenol, an isocyanate trimerization catalyst sold by Rohm and Haas under the designation DMP-10, and which is more particularly described in U.S. Pat. No. 3,717,596. The catalyst system, also, contained 0.5 part of dibutyltin dilaurate, as a urethane catalyst.

Pre-blended with the catalyst system were 2 parts of tris(2-chloroethyl) phosphate plasticizer, 20 parts of stabilized fluorotrichloromethane and 1 part of the polysiloxane surfactant sold by Dow Corning under the designation DC-193.

The reaction mixture was stirred at room temperature until an exotherm was generated in the vessel, as evidenced by the evolution of carbon dioxide in the vessel and the commencement of foam formulation therewithin. After the foam formulation was completed there was obtained a urethane-modified carbodiimide foam.

The foam sample was tested for physical properties, as hereinabove described. The foam was found to have a density of 1.9 pcf.; compressive strength, at 10% deflection of 19.1 psi.; a 38% tumbling friability weight loss; and a closed cell content of 97%. Butler Chimney Test findings were as 89% weight retention; a 6 inch flame height and 10 seconds to self-extinguishment.

EXAMPLE VI

The procedure of Example V was repeated, but wherein the amounts of polyols, carbodiimide catalyst and isocyanate trimerization catalyst were varied.

In this example 8.3 parts of THANOL R-350X and 16.7 parts of the flame retardant polyol were utilized. The catalyst system included 2 parts DMT, 0.5 part TDH, 3 parts DMP-10, and 0.5 part dibutyltin dilaurate. All the other ingredients were employed in the same quantities as described in Example V.

After the foam sample was obtained, the product was tested for physical properties in the manner heretofore described. It was found that the foam had a density of 2.1 pcf.; a compressive strength at 10% deflection of 23.9 and a tumbling friability weight loss of 17%. This reduction in tumbling friability weight loss was attributable to the greater quantities of polyol and the reduction in the amount of trimer catalyst.

The foam sample had a closed cell content of 97%. Butler Chimney Test results indicated an 88% weight retention; a flame height of seven inches and ten seconds to self-extinguish.

EXAMPLE VII

This example illustrates the preparation of urethane-modified carbodiimide foams by quasi-prepolymer technique in accordance with the present invention.

A series of foams were prepared utilizing the following procedure:

Into a suitable vessel equipped with stirring means was charged 100 parts of crude methylene diphenyldiisocyanate and varying amounts of the flame retardant polyol of Example V, alone, or in admixture with varying amounts of the THANOL R-350X polyol. The ingredients were stirred together to form an isocyanate-terminated quasi-prepolymer.

Where the additional polyol was utilized, the ingredients were mixed together under a nitrogen blanket.

After the prepolymer was prepared, there was then added thereto, at room temperature, and with stirring, varying amounts of a catalytic system consisting essentially of varying amounts of DMT carbodiimide catalyst as well as varying amounts of TDH and DMP-10 isocyanate trimerization catalysts. Pre-blended with the catalyst system were 2 parts of tris(2-chloroethyl) phosphate plasticizer, 1 part of a polysiloxane surfactant sold by Dow Corning under the designation DC-193 and 20 parts of stabilized fluorotrichloromethane blowing agent. After a few seconds an exotherm was generated in the vessel, as evidenced by the evolution of carbon dioxide and the commencement of foam formation. Shortly thereafter there was obtained a urethane-modified carbodiimide foam.

The following table, Table VI, sets forth the amounts of the varying ingredients used to prepare the foams hereof:

TABLE VI

| Sample | Flame Retardant | Other Polyol | DMT | TDH | DMP-10 |
|---|---|---|---|---|---|
| A | 5 | 15 | 3 | 1.5 | 6 |
| B | 10 | 15 | 3 | 0.5 | 6 |
| C | 15 | — | 3 | 3 | 8 |
| D | 15 | 15 | 3 | 3 | 6 |
| E | 15 | 30 | 3 | 1 | 6 |
| F | 20 | — | 3 | 4 | 8 |

These foams, thus, obtained were then tested for physical properties in the manner heretofore described. The results thereof are set forth below in Table VII.

TABLE VII

| Sample | Density pcf. | Comp. Str., 10% Defl. psi. | Friab., % Wt. Loss | Closed Cell Content % | Butler Chimney Test | | |
|---|---|---|---|---|---|---|---|
| | | | | | % Wt. Ret. | Flame Ht., in. | Time To Sx, Sec. |
| A | 2.0 | 26.4 | 26 | 101 | 90 | 6 | 10 |
| B | 2.3 | 29.6 | 13 | 111 | 91 | 7 | 10 |
| C | 2.5 | 20.4 | 19 | 96 | 92 | 6 | 10 |
| D | 2.3 | 27.8 | 18 | 98 | 92 | 6 | 10 |
| E | 2.2 | 27.1 | 13 | 96 | 92 | 6 | 10 |
| F | 2.2 | 18.8 | 16 | 94 | 92 | 7 | 10 |

It is, thus, seen that excellent urethane-modified carbodiimide foams are hereby obtained.

Having thus described the invention what is sought and desired to secure by Letters Patent is:

1. A method for enhancing the flame retardant properties of the skin of a rigid cellular foam product consisting essentially of a urethane-modified carbodiimide foam, the method consisting essentially of:
catalytically condensing an organic polyisocyanate and a flame retardant polyol selected from the group consisting of halogen-, phosphorous-, arsenic- and antimony-containing polyhydroxyl compounds in the presence of a catalytically sufficient amount of a carbodiimide catalyst to equilibrate the flame retardant properties of the skin of the product to the flame retardant properties of the core of the product.

2. The process of claim 1 wherein the flame retardant polyol is utilized in admixture with an active hydrogen-containing compound.

3. The process of claim 1 wherein the flame retardant polyol is present in an amount ranging from about 5 to 50 percent, by weight, based on the weight of the polyisocyanate.

4. The process of claim 1 which further comprises:
a. reacting the organic polyisocyanate and the flame retardant polyol to form an isocyanate-terminated quasi-prepolymer, and
b. catalytically condensing the quasi-prepolymer to obtain the urethane-modified rigid cellular foam.

5. The process of claim 4 wherein the flame retardant polyol is employed in admixture with the Mannich condensation reaction product of phenol, formaldehyde, diethanol amine, and propylene oxide.

6. The process of claim 1 wherein the flame retardant polyol is selected from the group consisting of (a) the oxyethylated or oxypropylated reaction product of tetrabromophthalic anhydride with an ethylene oxide or propylene oxide adduct of pentaerythritol, (b) the oxyethylated or oxypropylated reaction product of tetrabromophthalic anhydride with an ethylene oxide or propylene oxide adduct of 100% phosphoric acid and (c) the oxyethylated or oxypropylated reaction product of chlorendic anhydride with an ethylene oxide or propylene oxide adduct of pentaerythritol.

7. The process of claim 1 wherein the carbodiimide catalyst is used in admixture with an isocyanate trimerization catalyst, a urethane catalyst and mixtures thereof.

8. The process of claim 1 wherein the organic polyisocyanate corresponds to the formula:

wherein R is a polyvalent organic radical selected from the group consisting of aliphatic and aromatic hydrocarbon organic radicals, as well as mixtures thereof; and z is an integer corresponding to the valence of R and is at least 2.

9. The process of claim 8 wherein the organic polyisocyanate is crude methylene diphenyldiisocyanate.

* * * * *